US009318230B2

(12) United States Patent
Gao et al.

(10) Patent No.: US 9,318,230 B2
(45) Date of Patent: Apr. 19, 2016

(54) NANOSTRUCTURE DISPERSIONS AND TRANSPARENT CONDUCTORS

(71) Applicant: BASF Corporation, Florham Park, NJ (US)

(72) Inventors: Xuerong Gao, Livingston, NJ (US); Rui Zhang, Union, NJ (US)

(73) Assignee: BASF Corporation, Florham Park, NJ (US)

( * ) Notice: Subject to any disclaimer, the term of this patent is extended or adjusted under 35 U.S.C. 154(b) by 73 days.

(21) Appl. No.: 13/933,741

(22) Filed: Jul. 2, 2013

(65) Prior Publication Data

US 2014/0356524 A1 Dec. 4, 2014

Related U.S. Application Data

(60) Provisional application No. 61/829,486, filed on May 31, 2013, provisional application No. 61/841,970, filed on Jul. 2, 2013.

(51) Int. Cl.
| | | |
|---|---|---|
| *H01B 1/20* | (2006.01) | |
| *H01B 1/02* | (2006.01) | |
| *H01B 1/22* | (2006.01) | |
| *C09D 11/52* | (2014.01) | |
| *C23C 22/00* | (2006.01) | |

(52) U.S. Cl.
CPC .. *H01B 1/02* (2013.01); *H01B 1/20* (2013.01); *H01B 1/22* (2013.01); *C09D 11/52* (2013.01); *C23C 22/00* (2013.01)

(58) Field of Classification Search
CPC .. H01B 1/22; C09C 1/3081; C09C 2200/402; C09C 2200/502; C09D 11/52; B82Y 30/00

USPC .............. 252/512, 513, 514; 427/220, 215
See application file for complete search history.

(56) References Cited

U.S. PATENT DOCUMENTS

| | | |
|---|---|---|
| 7,585,349 B2 | 9/2009 | Xia et al. |
| 8,018,568 B2 | 9/2011 | Allemand et al. |
| 8,049,333 B2 | 11/2011 | Alden et al. |
| 2006/0189113 A1* | 8/2006 | Vanheusden et al. .......... 438/597 |
| 2010/0084599 A1* | 4/2010 | Lewis et al. .................. 252/62.2 |
| 2013/0001478 A1 | 1/2013 | Allemand et al. |

FOREIGN PATENT DOCUMENTS

JP   2009-94033   4/2009

OTHER PUBLICATIONS

English Translation of JP 2009-94033, 19 pgs.
Brust, Mathias et al., "Synthesis of Thiol-derivatised Gold Nanoparticles in a Two-phase Liquid-Liquid System", *J. Chem. Soc., Chem. Commun.* 1994, 801-802.
Chen, Dapeng et al., "Large-scale synthesis of silver nanowires via a solvothermal method", *J Mater Sci: Mater Electron* 22:6-13 2011, 6-13.
Lee, Jaemin et al., "Efficient Welding of Silver nanowire Networks without Post-Processing", *Nanowire Networks* 2013, 1-8.
Spaid, Michael, "Wet-Processable Transparent Conductive Materials", *Information Display* 1/12, 10-15.

* cited by examiner

*Primary Examiner* — Mark Kopec
*Assistant Examiner* — Haidung Nguyen
(74) *Attorney, Agent, or Firm* — Servilla Whitney LLC (57) ABSTRACT

A nanostructure dispersion comprising a mixture of host metallic nanostructures and metallic nanoparticles is provided. The nanostructures and nanoparticles are attracted to each other and remain attracted upon deposition of the mixture onto a substrate to form a transparent conductor. Also provided is a method of fabricating a transparent conductor.

15 Claims, 5 Drawing Sheets

NANOSTRUCTURE DISPERSIONS AND TRANSPARENT CONDUCTORS

CROSS-REFERENCE TO RELATED APPLICATIONS

This application claims priority to U.S. Provisional Application No. 61/829,486, filed May 31, 2013 and U.S. Provisional Application No. 61/841,970, filed on Jul. 2, 2013, the entire contents of which are herein incorporated by reference in their entirety.

TECHNICAL FIELD

The present invention relates generally to the field of nanostructure dispersions, transparent conductors and methods for fabricating transparent conductors using nanostructure dispersions. More particularly, the invention relates to a nanostructure dispersion comprising a mixture of host metallic nanostructures and metallic nanoparticles.

BACKGROUND

Transparent conductors are thin conductive films coated on high-transmittance surfaces or substrates and can be manufactured to have surface conductivity while maintaining optical transparency. Transparent conducting materials are widely used as transparent electrodes for liquid crystal displays (LCDs), touch panels, organic light-emitting diodes (OLEDs), and solar cells, as anti-static layers and as electromagnetic wave shielding layers.

Because of their high electrical conductivity and high optical transparency, the most commonly used materials for such applications are doped metallic oxides, such as indium tin oxide (ITO), fluorine doped tin oxide (FTO), doped zinc oxide, aluminum-doped zinc oxide, and indium-doped cadmium oxide. However, use of ITO and other metallic oxides can be problematic because metallic oxide films are prone to cracking on flexible substrates due to the brittleness of the metallic oxide. Additionally, application of metallic oxides on substrates is an expensive process that requires deposition by a sputtering method in a highly specialized vacuum chamber.

Conductive polymers, which are organic polymers that conduct electricity, have also been used as optically transparent electric conductors. However, conductive polymers generally have lower conductivity and higher optical absorption compared to metallic oxide films. Additionally, conductive polymers suffer from lack of chemical and long-term stability.

Carbon nanotubes have also attracted interest as transparent conductors due to their mechanical and electrical properties. Although carbon nanotubes networks are both conducting and transparent, they have not been able to achieve the right combination of sheet conductivity and transparency to be competitive with the metallic oxides, such as ITO.

Graphene, which is a material composed of pure carbon, with atoms arranged in a regular hexagonal pattern, has been used to produce transparent conductors. Graphene is a single-atomic-layer of graphite. Similar to carbon nanotubes, graphene's sheet conductivity and transparency are not competitive, and the large-scale fabrication of grapheme is still under development.

Alternatives to metallic oxides, carbon based materials, and conductive polymers for conductive layers include conductive components such as metallic nano structures, including metal nanowires. Conductive layers formed of metal nanowires demonstrate transparency and conductivity equal to, if not superior to, those formed of metallic oxides. Metal nanowire films can be fabricated by cost-effective and scalable roll-to-roll coating processes and can be coated on glass or flexible substrates without the risk of cracking. Additionally, conductive layers using metal nanowires exhibit mechanical durability that metallic oxide transparent conducting materials do not. Therefore, transparent conductors formed of metal nanowires can be used in a number of applications, including on glass and in flexible display applications.

Figure 1:
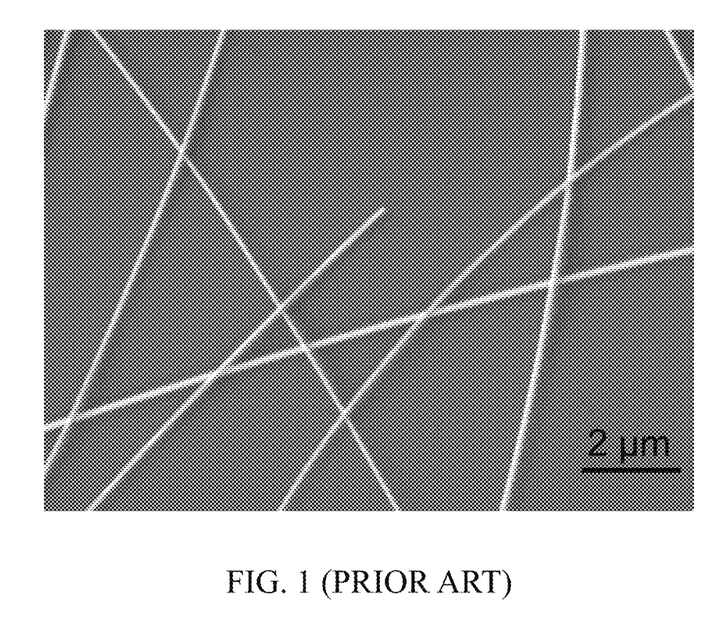
FIG. 1 is an enlarged view of a scanning electron microscope (SEM) image of silver nanowires without gold nanoparticles according to the prior art.

The transparency and conductivity of conductive layers fabricated from metal nanowires, however, depend upon the process by which the coatings are made. Typically, metal nanowires, such as, for example, silver nanowires, are grown via a polyol process. The metal nanowires are then purified and formulated into a coatable dispersion that is compatible with coating methods such as roll-to-roll slot die coating, spraying, meter-bar coating, or spin coating. By controlling the nanowire surface coverage, different sheet resistances can be produced. As illustrated in FIG. 1, when the silver nanowires form, there are no additional nanoparticles adhered to the surface of the nanowires. As-deposited films usually exhibit high resistance due to the insulation from surface-capping agents on nanowires and the loose contact between the nanowires. The conductivity of the metal nanowire film is largely influenced by wire-to-wire contact. In order to improve wire-to-wire contact for better electrical conductivity, heat treatment is usually required. The heat treatment typically occurs at 100° C. to 200° C. for 10 to 30 minutes. Without this heat treatment step, the resistance of the metal nanowire films is too high for electronic devices. While producing metal nanowire films with suitable resistance, such heat treatment, however, inhibits the use of metal nanowires on heat-sensitive substrates and adds an additional step to the fabrication process.

Japanese Patent Application Publication No. JP2009-94033 discloses a method of joining metallic nanowires and metallic nanoparticles by applying energy to a dispersion containing the metallic nanowires and metallic nanoparticles. JP2009-94033 states that the nanoparticles and nanowires are "joined" in a state in which the nanowires and nanoparticles are fused into a single continuous body electrically. JP2009-94033 distinguishes the fused nanowires and nanoparticles from when objects are simply in contact, stating that a loss of conductivity occurs due to contact resistance. JP2009-94033 describes the joining as "nanosoldering," specifically applying laser energy from a Nd-YAG laser with light equivalent to the surface plasmon absorption wavelength of the metal nanoparticles. The lowest resistivity obtained in JP2009-94033 is 90 Ω/sq at 88% transmittance. This is close to the industry standard for Indium Tin Oxide (ITO) film (100 Ω/sq at 90% transmittance). This performance, however, was obtained with highly concentrated dispersions of silver nanowires (5%) and gold nanoparticles (5%), after heat treatment at 80° C. and prolonged laser irradiation. Table 1 of JP2009-94033 demonstrated that a 5% dispersion is more effective than a 0.5% dispersion in joining the nanoparticles to the nanowires. JP2009-94033 did not report data on haze, but it is known in the field that a more highly concentrated dispersion with nanostructures will result in higher haze to the film. Haze refers to the milky appearance of the surface, generated by discrete particles in the film that cause diffused light with low intensity adjacent to the main direction of reflection. Haze is not desired for touch panel applications. Thus the process described in JP2009-94033 is not suitable for making transparent conductors with low resistivity and low haze simultaneously. In addition, such a process requiring application of laser energy to nanosolder the nanoparticles to the nanowires would be costly and difficult to utilize in large scale manufacturing processes.

The article "Efficient Welding of Silver Nanowire Networks without Post-Processing," Small, pp. 1-8, 2013 by Jaemin Lee, Inhwa Lee, Taek-Soo Kim and Jung-Yong Lee describes the formation of silver nanowire (AgNW) films and observes that the presence of a polymer coating on the surface of the nanowire, namely, polyvinylpyrrolidone (PVP), causes a critical problem of inhibiting conduction across the wires. Lee et al. note that the PVP present between the nanowires increases contact resistance and limits the sheet resistance of the AgNW network. Therefore, Lee et al. undertake steps to remove the layer of PVP a few nanometers thick on the AgNWs to facilitate electrical connection between the wires. Lee et al. use polar solvents to exfoliate the PVP that adheres to the wires by weak Van der Waals forces. Lee et al. indicate that ethylene glycol, glycerol, or alcohol together with centrifugation is needed to remove the PVP layer. Lee et al. reduced the PVP layer from 4 nm to 0.5 nm by using a washing and filtering with methanol. Such washing techniques are time and labor intensive, limiting the application of such a process to large scale industrial production. Lee et al. demonstrated that improved wire-to-wire contact can be obtained via spray deposition at an optimized condition. However, this is not adaptable for conventional large-scale deposition techniques such as roll-to-roll printing. Lee et al. do not discuss the interaction of nanoparticles and nanowires.

Accordingly, there is a need for a method of forming transparent conductors with acceptable optical and electrical properties that can be used with heat-sensitive substrates. It would be desirable to provide a method that did not require extensive washing, filtering, and/or application of radiation or heat to solder the wires together.

SUMMARY

A first embodiment pertains to a nanostructure dispersion comprising: a mixture of a dispersion of host metallic nanostructures having a first organic coating on an exterior surface of the host metallic nanostructures and metallic nanoparticles having a second organic surface coating on an exterior surface of the metallic nanoparticles, the second organic coating being different than the first organic coating such that the nanostructures and nanoparticles are attracted to each other upon admixture of the host metallic nanostructures and metallic nanoparticles and remain attracted upon deposition of the mixture onto a substrate.

In a second embodiment, the nanostructure dispersion of the first embodiment is modified, wherein the metallic nanoparticles are preformed and provided in a dispersion or in situ generated upon formation of the mixture.

In a third embodiment, the nanostructure dispersion of the first and second embodiments are modified, wherein upon application of the dispersion to a substrate, the mixture forms a conductive layer including a first region defined by the metallic nanostructures and metallic nanoparticles attracted to the nanostructures and a second region including an open area, wherein there are substantially no free nanoparticles in the open area.

In a fourth embodiment, the nanostructure dispersion of the first through third embodiments are modified, wherein the nanostructures and nanoparticles are attracted to each other upon admixture without radiation or heating.

In a fifth embodiment, the nanostructure dispersion of the first through fourth embodiments are modified, wherein the first organic coating comprises a layer that is less than 10 nm in thickness.

In a sixth embodiment, the nanostructure dispersion of the first through fifth embodiments are modified, wherein the first organic coating comprises a polymer.

In a seventh embodiment, the nanostructure dispersion of the first through sixth embodiments are modified, wherein the polymer comprises polyvinylpyrrolidone.

In an eighth embodiment, the nanostructure dispersion of the first through seventh embodiments are modified, wherein the second organic coating is selected from citrate, polyvinyl pyrollidone (PVP), tannic acid, lipoic acid, polyethylene glycol (PEG), and polyethyleneimine.

In a ninth embodiment, the nanostructure dispersion of the first through eighth embodiments are modified, wherein the second organic coating comprises citrate.

In a tenth embodiment, the nanostructure dispersion of the first through ninth embodiments are modified, wherein the nanostructures and nanoparticles are adhered to each other and remain adhered upon deposition of the mixture onto a substrate.

In an eleventh embodiment, the nanostructure dispersion of the first through tenth embodiments are modified, wherein the metallic nanostructures comprise metallic nanowires.

In eleventh twelfth embodiment, the nanostructure dispersion of the first through eleventh embodiments are modified, wherein the metallic nanowires comprise a metal selected from the group consisting of Ag, Cu, Au, Al, Rh, Ir, Co, Zn, Ni, In, Bi, Pb, Fe, Pd, Pt, Sn, Ti, combinations thereof and alloys thereof.

In a thirteenth embodiment, the nanostructure dispersion of the first through twelfth embodiments are modified, wherein the metallic nanowires comprise Ag.

In a fourteenth embodiment, the nanostructure dispersion of the first through thirteenth embodiments are modified, wherein the metallic nanoparticles comprise a metal selected from the group consisting of Au, Ag, Cu, Al, Rh, Ir, Co, Zn, Ni, In, Bi, Pb, Fe, Pd, Pt, Sn, Ti, combinations thereof and alloys thereof.

In a fifteenth embodiment, the nanostructure dispersion of the first through fourteenth embodiments are modified, wherein the metallic nanoparticles comprise a metal selected from the group consisting of Au, Pt, Ag, combinations thereof, or alloys thereof.

Another aspect of the invention pertains to a transparent conductor. In a sixteenth embodiment, a transparent conductor comprises: a substrate and a conductive layer on the substrate, the conductive layer including a nanostructure dispersion comprising: a mixture of a dispersion of host metallic nanostructures having a first organic coating on an exterior surface of the host metallic nanostructures and metallic nanoparticles having a second organic surface coating on an exterior surface of the metallic nanoparticles, the second organic coating being different than the first organic coating such that the nanostructures and nanoparticles are attracted to each other upon admixture of the host metallic nanostructures and metallic nanoparticles and remain attracted upon deposition of the mixture onto a substrate.

In a seventeenth embodiment, the transparent conductor of the sixteenth embodiment is modified, wherein the conductive layer includes a first region defined by the metallic nanostructures and metallic nanoparticles attracted to the metallic nanostructures and a second region including an open area, wherein there are substantially no free metallic nanoparticles in the open area.

In an eighteenth embodiment, the transparent conduction of the sixteenth and seventeenth embodiments are modified, wherein the first organic coating comprises a polymer.

In a nineteenth embodiment, the transparent conductor of the sixteenth through eighteenth embodiments are modified, wherein the first organic coating comprises PVP.

In a twentieth embodiment, the transparent conductor of the sixteenth through nineteeth embodiments are modified, wherein the metallic nanostructures comprise metallic nanowires having an aspect ratio of length/diameter.

In a twenty-first embodiment, the transparent conductor of the sixteenth through twentieth embodiments are modified, wherein the metallic nanowires comprise a metal selected from the group consisting of Ag, Cu, Au, Al, Rh, Ir, Co, Zn, Ni, In, Bi, Pb, Fe, Bi, Pd, Pt, Sn, Ti, combinations thereof and alloys thereof.

In a twenty-second embodiment, the transparent conductor of the sixteenth through twenty-first embodiments are modified, wherein the metallic nanowires comprise Ag.

In a twenty-third embodiment, the transparent conductor of the sixteenth through twenty-second embodiments are modified, wherein the aspect ratio of the metallic nanowires exceeds 100.

In a twenty-fourth embodiment, the transparent conductor of the sixteenth through twent-third embodiments are modified, wherein the metallic nanoparticles comprise a metal selected from the group consisting of Au, Ag, Cu, Al, Rh, Ir, Co, Zn, Ni, Bi, Pb, In, Fe, Pd, Pt, Sn, Ti, combinations thereof and alloys thereof.

In a twenty-fifth embodiment, the transparent conductor of the sixteenth through twenty-fourth embodiments are modified, wherein the metallic nanoparticles comprise Au, Pt, Ag, or combinations thereof.

In a twenty-sixth embodiment, the transparent conductor of the sixteenth through twenty-fifth embodiments are modified, wherein the nanostructures and nanoparticles are present in a mass ratio of nanowires to nanoparticles between 50:1 to 50,000:1.

In a twenty-seventh embodiment, the transparent conductor of the sixteenth through twenty-sixth embodiments are modified, wherein the metallic nanoparticles attracted to the metallic nanostructures reduces the sheet resistance of the conductive layer compared to a conductive layer that does not include nanoparticles attracted to the nanostructures.

In a twenty-eighth embodiment, the transparent conductor of the sixteenth through twenty-seventh embodiments are modified, wherein the conductive layer is a spin-coated layer.

In a twenty-ninth embodiment, the transparent conductor of the sixteenth through twenty-eighth embodiments are modified, wherein the metallic nanowires comprise silver and the metallic nanoparticles comprise gold.

In a thirtieth embodiment, the transparent conductor of the sixteenth through twenty-ninth embodiments are modified, wherein the conductor has a sheet resistance that is less than 100 Ω/sq at 90% transmittance.

A third aspect is directed to a method. In a thirty-first embodiment, a method for fabricating a transparent conductor comprises: providing a metallic nanostructure dispersion; mixing metallic nanoparticles with the metallic nanostructure dispersion to form a mixture, wherein the nanoparticles are attracted to the nanostructures upon admixture and without application of radiation or heat; and coating the mixture onto a substrate to form a conductive layer, wherein the metallic nanoparticles remain attracted to the metallic nanostructures.

In a thirty-second embodiment, the method of the thirty-first embodiment is modified, wherein the metallic nanoparticles are preformed and provided in a dispersion or in situ generated upon the mixing of the metallic nanoparticles and the metallic nanostructure dispersion.

In a thirty-third embodiment, the method of the thirty-first and thirty-second embodiments are modified, wherein the metallic nanostructures comprise metallic nanowires.

In a thirty-fourth embodiment, the method of the thirty-first through thirty-third embodiments are modified, wherein the metallic nanowires comprise a metal selected from the group consisting of Ag, Cu, Au, Al, Rh, Ir, Co, Zn, Ni, In, Bi, Pb, Fe, Pd, Pt, Sn, Ti, combinations thereof and alloys thereof.

In a thirty-fifth embodiment, the method of the thirty-first through thirty-fourth embodiments are modified, wherein the metallic nanowires comprise Ag.

In a thirty-sixth embodiment, the method of the thirty-first through thirty-fifth embodiments are modified, wherein the metallic nanoparticles comprise a metal selected from the group consisting of Au, Ag, Cu, Al, Rh, Ir, Co, Zn, Ni, In, Bi, Pb, Fe, Pd, Pt, Sn, Ti, combinations thereof and alloys thereof.

In a thirty-seventh embodiment, the method of the thirty-first through thirty-sixth embodiments are modified, wherein the metallic nanoparticles comprise Au, Pt, Ag, combinations thereof, or alloys thereof.

In a thirty-eighth embodiment, the method of the thirty-first through thirty-seventh embodiments are modified, wherein the substrate is selected from glass, polyesters, polyolefins, vinyl resins, polyether ether ketone (PEEK), polyether sulphone (PES), polycarbonate (PC), polyamide, polyimide, acrylic resins, triacetyl cellulose (TAC), and combinations thereof.

In a thirty-ninth embodiment, the method of the thirty-first through thirty-eighth embodiments are modified, wherein the coated layer defines a conductive area including the metallic nanostructures and the metallic nanoparticles and an open area substantially free of nanoparticles.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

It has been determined that the presence of an organic coating on the external surface of a host nanostructure, such as a nanowire and on the surface of a nanoparticle can provide the production of transparent conductors with low sheet resistance and excellent transparency without the application of heat, pressure, or radiation during processing of the dispersions or after coating of a mixed dispersion of host nanostructures and nanoparticles onto a substrate. Thus, embodiments of the present invention provide a flexible, inexpensive approach that can be used to coat a wide variety of substrates, particularly substrates that are sensitive to heat and/or high forces. Provided herein are nanostructure dispersions, conductive layers, transparent conductors, and methods of fabrication. According to various embodiments, the conductive layers comprising nanostructure dispersions are suitable for use on all types of substrates, including glass, flexible substrates, and heat-sensitive substrates.

One aspect of the invention relates to a nanostructure dispersion comprising a mixture of a dispersion of host metallic nanostructures and metallic nanoparticles. The host metallic nanostructures have a first organic surface coating on an exterior surface of the metallic nanostructures. The metallic nanoparticles have a second organic surface coating on an exterior surface of the metallic nanoparticles. The second organic coating is different than the first organic coating such that the nanostructures and nanoparticles are attracted to each other and remain attracted upon deposition of the mixture onto a substrate.

With respect to the terms used in this disclosure, the following definitions are provided.

As used herein, the term "nanostructure" refers to electrically conductive nanosized structures. Thus, in embodiments, the term "nanostructure" refers to an object of intermediate size between microscopic and molecular structures. Nanostructures include, but are not limited to, nanofilms, nanoflowers, nanocages, nanofoams, nanorods, nanorings, nanoshells, nanomesh, nanocomposites, nanoparticles, nanowires, nanofabrics, nanofibers, nanoflakes, nanopillars, and nanoplatelets. In one or more embodiments, the nanostructures comprise nanowires and nanoparticles.

In specific embodiments, at least one dimension of nanostructures (i.e., width or diameter) is less than 500 nm, more typically, less than 200 nm or less than 50 nm. In one or more embodiments, the width or diameter of the nanostructures are in the range of 1 to 1000 nm, 2 to 500, or 10 to 150 nm. Nanostructures can be in a variety of shapes or geometries. For nanostructures that are not isotropic, the geometry of a nanostructure may be defined by its aspect ratio or the ratio of the length to width (or diameter). In one or more embodiments, nanostructures are isotropic, having an aspect ratio approximately equal to or equal to one. An example of an isotropic nanostructure is a nanoparticle. A specific example of a nanostructure that is anisotropic is a nanowire, which refers to a nanostructure having an aspect ratio greater than one.

As used herein, the term "nanowire" refers to a nanostructure having a thickness or diameter constrained to 200 nanometers or less and having an unconstrained length. Often, nanowires are referred to as one-dimensional materials. Typical nanowires exhibit aspect ratios of 100 to 100,000 or more. In one or more embodiments, the aspect ratio exceeds 100. In other embodiments, the aspect ratio exceeds 200. In still further embodiments, the aspect ratio exceeds 1000. According to one or more embodiments, the average diameter of the metal nanowires is 200 nm or less. The influence of light scattering can be reduced by adjusting the diameter of the metal nanowires. If the average diameter of the nanowire is too large, inhibition of light transmittance can be observed. On the other hand, however, conductivity of the nanowire can be improved by increasing the diameter of the metal nanowire. Thus, there is a balancing between conductivity and transmittance. In one or more embodiments, the average diameter of the nanowires is in the range of 10 nm to 150 nm.

The dimensions of nanostructures can be measured by microscopic techniques such as scanning electron microscopy (SEM).

As used herein, the term "dispersion" refers broadly to a heterogeneous mixture containing solid substances dispersed throughout liquid substances with or without the presence of dispersing agents. The term "dispersion" includes suspensions and colloids.

As used herein, the term "suspension" refers to a heterogeneous mixture containing solid particles that are sufficiently large for sedimentation. The internal phase (solid) is dispersed throughout the external phase (liquid) through agitation with or without the presence of dispersing agents.

As used herein, the term "colloid" refers to a substance that is microscopically dispersed throughout another substance. A colloidal system consists of two separate phases, a dispersed phase and a continuous phase in which the colloid is dispersed.

As used herein, the term "host" refers to a first metal nanostructure that forms a network or mesh and supports a second metal nanostructure, for example, metal nanoparticles. The first and second nanostructures interact in such a way that the second nanostructures adhere to the network or mesh formed by the first nanostructures.

According to one or more embodiments, a nanostructure dispersion comprises a mixture of a dispersion of host metallic nanostructures and metallic nanoparticles. The host metallic nanostructures and metallic nanoparticles are attracted to each other in such a way that the nanoparticles are adhered to the metallic nanostructures, and the metallic nanostructures are adhered to themselves. In specific embodiments, the metallic nanostructures are metallic nanowires, so that there is wire-to-wire contact in addition to contact between the metallic nanowires and metallic nanoparticles.

As used herein, the term "attracted" refers to a physical or chemical interaction that draws one nanostructure towards another nanostructure. In one or more embodiments, the metal nanostructures are physically adhered to the metal nanoparticles such that at least a portion of the metal nanostructures are contacting the metal nanoparticles. In one or more embodiments, the attraction and adhesion occur without the use of heat or radiation, including, but not limited to, microwave radiation, and laser or light irradiation. In one or more embodiments, a layer of polymer is provided between the metal nanostructures and metal nanoparticles. In a specific embodiment, a layer of polyvinylpyrollidone (PVP) is provided between the metal nanostructures and metal nanoparticles.

The conductivity of the metal nanowire film is also affected by the length of the nanowire, with longer metal nanowires having higher film conductivity at a certain transmittance, according to the percolation theory. However, the dispersion of longer nanowires tends to have poor stability and the resulted nanowire aggregation lowers transparency. Thus, there is again a balancing between conductivity and transmittance. According to one or more embodiments, the average length of the metal nanowire is at least 5 micrometers. In one or more embodiments, the average length of the metal nanowire is in the range of from 5 to 100 micrometers. In a specific embodiment, the average length of the metal nanowire is from 5 to 50 micrometers.

In one or more embodiments, the metal nanowire comprises a metal selected from the group consisting of Ag, Cu, Au, Al, Rh, Ir, Co, Zn, Ni, In, Bi, Pb Fe, Pd, Pt, Sn, Ti, combinations thereof and alloys thereof. In specific embodiments, the metal nanowires comprise Ag.

The metal nanowires can be prepared by any process known to those of skill in the art. For example, silver nanowires can be prepared according to the process provided in U.S. Pat. No. 7,585,349. Gold nanowires can be prepared according to the process provided in U.S. Pat. No. 7,771,689. Cobalt nanowires can be prepared according to the process provided in U.S. Pat. No. 7,407,887. Copper nanowires can be prepared according to the process provided in U.S. Pat. No. 6,858,318. Metal nanowires can also be purchased from commercial suppliers.

As used herein, the terms "coating" or "organic surface coating" refer to a covering that is applied to the surface of an object. In one or more embodiments, the metallic nanostructures have a first organic surface coating on an exterior surface of the metallic nanostructures. The first organic surface coating is a thin covering applied to the exterior surface of the metallic nanostructures. Without intending to be bound by theory, it is thought that the first organic surface coating adheres to the nanostructures through a similar mechanism including but not limited to, ionic charge interaction, hydrogen bonding, dipole-dipole interactions, and London-Van der Waals forces. It can be also achieved through chemical bond including but not limited to, covalent, ionic, metallic, and donor/acceptor interaction. The coating or organic surface coating on the host nanostructure is, according to one or more embodiments, not greater than 10 nm. A balance of coating thickness is preferred because the coating has to provide sufficient anchoring sites to attract the second nanostructure, while avoiding excessive insulation by the organic surface coating. In specific embodiments, the thickness of the coating or organic surface coating is less than 10 nm. In other specific embodiments, the range thickness of the coating or organic surface coating on the host nanostructure is down to a single monolayer. It is noted that the actual thickness of the coating is dependent upon the particular organic used as the coating. The coating thickness can be determined by transmission electron microscopy (TEM), as indicated in Lee et al., "Efficient Welding of Silver Nanowire Networks without Post-Processing," Small, pp. 1-8, 2013, the entire content of which is incorporated herein by reference. In specific embodiments, the coating or surface coating on the host nanostructure is a polymeric coating, and in very specific embodiments, the coating is polyvinylpyrrolidone (PVP). We have determined that providing and/or maintaining a thin organic coating, polymeric coating (e.g., a PVP coating) on the host nanostructure is beneficial to provide attraction between the host nanostructure and nanoparticles, particularly when the organic coating on the host nanostructure and nanoparticles is different. The coating can occur and be processed without any application of radiation, thermal energy or heat, and provide excellent transparency and low sheet resistance, without increase of haze. When the processes described herein are used to manufacture a transparent conductor, substantially all of the nanoparticles are adhered to the host nanostructure, and there are substantially no free metallic nanoparticles in the open area between the nanostructure adhered to nanoparticles on the substrate, as will be more apparent below. As used herein, the term "free nanoparticle" refers to nanoparticles that are added into the host nanostructure dispersion but not attached or attracted to the host nanostructures. In one or more embodiments, the quantity of free nanoparticles is reduced such that there is no increase in haze. In one or more embodiments, "substantially no" or "substantially free of" means that there are very few to no metal nanoparticles present in the open area of the nanowire and nanoparticle network. In one or more embodiments, "substantially no" refers to less than 10% by weight, and in one or more specific embodiments, less than 2% by weight. The weight percentage is defined as the weight of particles in the open area divided by the weight of nanoparticles adhered to the nanostructure networks. The presence or absence of free nanoparticles in the open area can be readily determined by examining the substrate open area with a scanning electron microscope (SEM) or transmission electron microscopy (TEM). In specific embodiments, there are no nanoparticles present at all in the open area. It should be noted, however, that for nanoparticles that are smaller than 2 nm, the quantity of nanoparticles present in the open area cannot be easily determined, and such small nanoparticles are unlikely to contribute to changes in optical performance of a transparent conductor. Thus, "substantially no" and "substantially free of" refers, in general, to nanoparticles that are larger than 2 nm in size. It should also be noted that for colloids with particle size smaller than 2 nm, the light scattering effect is significantly lower than larger particles. In such case, more free particles in the open area will not impair optical performance of the coatings, but attached particles should still work in the same way to improve electrical performance.

According to one or more embodiments, the first organic coating can be a polymeric coating. In one or more embodiments, the polymeric coating is selected from polyvinylpyrrolidone (PVP), polyvinyl alcohol (PVA), polyethylene glycol (PEG), polyacrylates, polyurethanes, or commercial specialized polymer dispersants. In specific embodiments, the first organic coating is a polymeric coating comprising polyvinylpyrrolidone (PVP). In one or more embodiments, when the nanowires are obtained from a commercial supplier, they can be supplied with a polymeric coating or capping agent. A surface capping agent, such as a polymer, can be added in the formation of the nanostructure to control the growth of the nanostructure and help disperse the nanostructures in solution.

In one or more embodiments, a thin layer of polymeric coating remains, which allows the nanowires to be attracted to the nanoparticles. As measured by SEM or TEM, the first organic surface coating can have a thickness as defined above.

Figure 2:
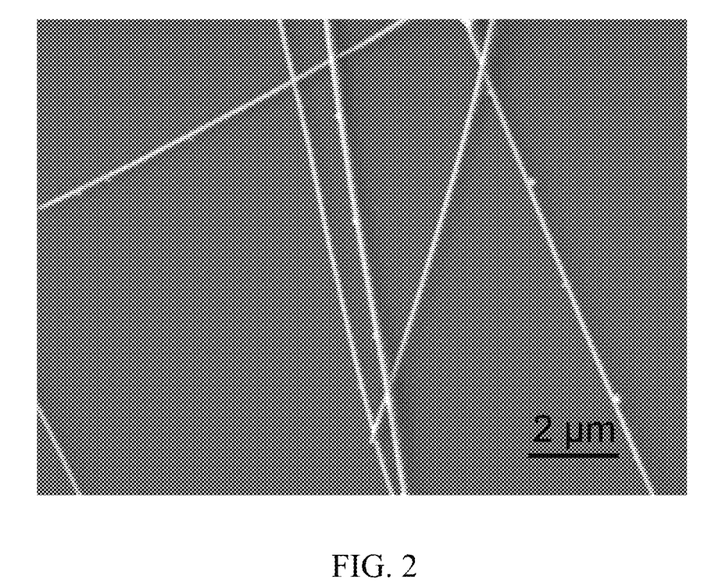
FIG. 2 is an enlarged view of a SEM image of silver nanowires with gold nanoparticles prepared according to the process of the invention.

According to one or more embodiments, the metal nanoparticles are introduced to the metal nanowires without the use of heat or radiation, including microwave and optical radiation, resulting in improvement of wire-to-wire contact. As illustrated by FIG. 2, when the metal nanoparticles are introduced to the metal nanowires at ambient temperature in the absence of heat or radiation, the result is the adherence of the metal nanoparticles onto the metal nanowires, with substantially no nanoparticles present in the open area of the framework. Additionally, according to one or more embodiments, the transparent conductive materials prepared according to the invention will not degrade in terms of optical performance, such as transparency and haze. Without intending to be bound by theory, it is thought that the absence of nanoparticles in the open area of the nanowire framework leads to the non-degradation in optical properties. In contrast, JP2009-94033 concluded "the probability of joining increases as the irradiation time is increased and the solution concentration is increased." Thus when the "probability of joining" is low, there are gold nanoparticles not joining to the silver nanowire, staying in the open area of the framework.

Without intending to be bound by theory, it is thought that introducing the metal nanoparticles to the dispersion of host metal nanostructures at ambient temperature in the absence of heat and radiation leads to re-dispersing the nanostructures in the mixture. When the metal nanoparticles have a less stable capping agent, then the capping agent can be replaced partially by the more stable capping agent on the surface of nanostructures from the first dispersion. Thus, the nanoparticles with a less stable capping agent can be attached to the nanostructures through the free anchoring sites of the more stable capping agent on the nanostructures. When the nanoparticles have a more stable capping agent, the same principle applies as well. Such an attraction between the nanostructures and nanoparticles can happen without heat or additional optical irradiations. By carefully selecting the capping agent associated with the host nanostructure and the nanoparticles, the interaction between the host nanostructures and nanoparticles can be manipulated to produce various frameworks in the film.

As used herein, the term "nanoparticle" refers to a small object that behaves as a whole unit in terms of its transport and properties. Nanoparticles generally have an average particle diameter of from 2 to 250 nanometers. According to one or more embodiments, the average particle diameter of the nanoparticle is from 5 to 100 nanometers. In a very specific embodiment, the average particle diameter of the nanoparticles is 5, 20, and 100 nm. According to one or more embodiments, the metallic nanoparticles can be preformed and provided in a dispersion, or they can be in situ generated. When the metallic nanoparticles are in situ generated, a metal source and a reducing agent are provided that produce metallic particles after admixing with the dispersion of host nanostructures. The metal sources include, but are not limited to $AgNO_3$, $HAuCl_4$, and $K_2PtCl_4$. The reducing agents include, but are not limited to, ethylene glycol, sodium citrate, and sodium borohydride. A capping agent that is different from the capping agent on the host nanostructures may also be added in the formation of nanoparticles. The capping agents include, but are not limited to, sodium citrate, tannic acid, PVP, and PEG.

Without intending to be bound by theory, it is thought that the nanoparticles aid in increasing the wire-to-wire contact between the metal nanowires, creating a "bridge" and adhering the crossed nanowires together, thereby reducing sheet resistance of the metal nanowire film.

According to one or more embodiments, the metal nanoparticles can comprise a metal selected from the group consisting of Ag, Cu, Au, Al, Rh, Ir, Co, Zn, Ni, In, Bi, Pb, Fe, Pd, Pt, Sn, Ti, combinations thereof and alloys thereof. In one or more embodiments, the metal nanoparticles comprise a metal selected from the group consisting of Au, Ag, Pt, combinations thereof, and alloys thereof. In specific embodiments, the metal nanoparticles comprise Au. The metal nanoparticles can be produced by any means known to those of skill in the art. The metal nanoparticles can be produced by precipitation from solutions, laser ablation, gas phase synthesis such as plasma or flame synthesis. The metal crystals can grow prior to mixing, or in situ when admixed with the host metallic nanostructures. The capping agent or organic coatings can be introduced to the metal nanoparticles before or after crystal nucleations. The capping agent or organic coating can be removed and replaced with another one, partially or up to 100%. For example, gold nanoparticles can be produced according to a process described in Turkevich J., Stevenson P. C., Hillier J., Discuss Faraday Soc., 1951, 11, 55-75, *A Study of the Nucleation and Growth Processes in the Synthesis of Colloidal Gold.*

According to one or more embodiments, the nanoparticles include a second organic surface coating. In one or more embodiments, the first organic surface coating and the second organic surface coating are different. The second organic surface coating is coated on an exterior surface of the metallic nanoparticles. In one or more embodiments, the second organic surface coating is selected from citrate, polyvinyl pyrollidone (PVP), tannic acid, lipoic acid, polyethylene glycol (PEG), and polyethyleneimine. In specific embodiments, the second organic coating comprises citrate. Citrate is a non-polymeric coating that is easily displaceable.

According to one or more embodiments, the metal nanowire and metal nanoparticles are present in a ratio of greater than 50:1 by mass and up to a ratio of 50,000:1 by mass. In one or more embodiments, the ratio of nanowires to nanoparticles exceeds 100:1. In specific embodiments, the ratio of metal nanowire to metal nanoparticles exceeds 1000:1 by mass.

According to one or more embodiments, the average diameter and average length of the metal nanowires and metal nanoparticles can be determined by SEM imaging. TEM can be used to determine the average particle sizes below 20 nm.

In one or more embodiments, metal nanowires and metal nanoparticles are mixed together at ambient temperature in the absence of radiation to produce a nanostructure dispersion. According to specific embodiments, the metal nanowires comprise silver and the metal nanoparticles comprise gold. In one or more embodiments, the gold nanoparticles adhere to the silver nanowires and improve the wire-to-wire contact of the silver nanowires.

Without intending to be bound by theory, it is thought that wire-to-wire contact between the metal nanowires can affect the sheet resistance of the conductive layer produced. Furthermore, it is thought that the addition of metal nanoparticles to metal nanowires can lead to better wire-to-wire contact without detrimentally effecting optical properties of the conductive layer produced. In fact, it is thought that the metal nanoparticles improve electrical conductivity and lead to lower resistance.

According to one or more embodiments, application of the nanostructure dispersion to a substrate forms a conductive layer including a first region defined by the metallic nanostructures and metallic nanoparticles attracted to the nanostructures and a second region including an open area. In one or more embodiments, there are substantially no nanoparticles in the open area.

As used herein, the terms "open area," "void space," or "open space" refer to the open space between the nanowires. It is the area in the conductive layer that is not covered by the nanowires and thus allows incident light to pass through. The open area determines the light transmittance of the conductive layer.

Without intending to be bound by theory, it is thought that higher coverage by metal nanoparticles in the open area of the metal nanowire network lowers the transparency of the film. Thus, according to one or more embodiments, the metal nanoparticles stay only on the metal nanowires and do not spread into the open area of the metal nanowire film.

As used herein, the term "conductive layer" refers broadly to thin layers of film that are simultaneously optically transparent and electrically conductive. Conductive layers are applied to a rigid or flexible substrate to form a "transparent conductor." Transparent conductors are key elements in a wide variety of technologies including touch screens, flat panel displays, photovoltaics, low-e windows, and electrochromics.

According to one or more embodiments of a second aspect of the invention, a transparent conductor is created by coating a nanostructure dispersion comprising a mixture of a dispersion of host metallic nanostructures and metallic nanoparticles adhered to the metal nanostructures on the surface of a substrate. Upon drying, the metal nanostructures and metal nanoparticles adhered to the metal nanostructures form an interconnected, two-dimensional mesh, or a conductive layer, on the surface of the substrate.

The sheet resistivity of the conductive layer can be controlled by changing the number density of metal nanowires on the surface of the substrate and/or by changing the density of nanoparticles at a fixed number density of metal nanowires. The number density of metal nanowires required to achieve a continuously conductive path on a substrate is inversely related to the square of the length of the metal nanowires. Accordingly, in one or more embodiments, high aspect-ratio metal nanowires are well suited to achieve high electrical conductivity with a minimum amount of metal. For example, in one or more embodiments, the aspect ratio of the nanowires exceeds 100. In specific embodiments, the aspect ratio of the nanowires exceeds 500.

The metals used to produce the nanowires, e.g. silver, are much more conductive than metallic oxides, such as ITO. According to one or more embodiments, this difference in conductivity permits a metal nanowire material to cover a very small portion of the substrate and yet achieve equivalent electrical properties of metallic oxides. The remaining surface of the substrate consists of void space or open space, which determines the light transmission of the conductive layer.

Optical properties that govern the performance of a conductive layer at a given sheet resistivity are light transmission, color, and haze. According to one or more embodiments, a relatively low refractive index (~1.5) is desired, as this minimizes reflection losses and optical appearance issues arising from patterned layers on glass or other substrates due to differences in refractive index.

As used herein, the term "substrate" refers broadly to a material upon which a conductive layer is disposed. The substrate can be rigid or flexible. The substrate can be opaque or clear. In one or more embodiments the substrate is selected from glass, polyesters, including by not limited to polyethylene terphthalate (PET) and polyethylenenaphthalate, polyolefins, including but not limited to polyethylene (PE), polypropylene (PP), polystyrene, and cyclic olefin system resins, vinyl resins, including but not limited to polyvinyl chloride and polyvinylidene chloride, polyether ether ketone (PEEK), polyether sulphone (PES), polycarbonate (PC), polyamide, polyimide, acrylic resins, triacetyl cellulose (TAC), and combinations thereof. In one or more embodiments, the light transmittance of the substrate is at least 80%. In specific embodiments, the light transmittance of the substrate is not less than 90%. In one or more embodiments, the haze of the substrate is less than 1%. As used herein, the term "haze" refers to the milky appearance of the surface, generated by discrete particles in the film that cause diffused light with low intensity adjacent to the main direction of reflection.

According to one or more embodiments, when the nanoparticles are adhered to the metal nanowires, the sheet resistance of the conductive layer is reduced compared to a conductive layer that does not include metal nanoparticles adhered to the metal nanowires. In a specific embodiment, the transparent conductor has a sheet resistance that is less than 100Ω per square at 90% transmittance.

When the nanostructure dispersion comprising a first metallic nanostructure and a second metallic nanoparticle are used to form a conductive layer on a transparent conductor, the conductive layer can have a thickness of 5 to 100 nm. In one or more embodiments, the conductive layer has a thickness of 10 to 80 nm in order to maximize the relation between conductivity and transparency.

The total light transmittance of the conductive layer can be measured in accordance with methods known to those of skill in the art, such as UV-Vis absorption or BYK Haze Gard. According to one or more embodiments, the total light transmittance of the conductive layer is at least 80% and can be as high as 98%. When the conductive layer is deposited or laminated on a substrate, the overall transmittance can be decreased. In one or more embodiments, the transmittance of the transparent conductor is at least 50%, at least 60%, at least 70%, or least 80% and may be as high as at least 92%.

The haze of the conductive layer can be measured in accordance with methods known to those of skill in the art, such as BYK Haze Gard or haze meter. According to one or more embodiments, the haze of the conductive layer is no more than 20%. In specific embodiments, the haze of the conductive layer is no more than 10%. In other specific embodiments, the haze of the conductive layer is no more than 5%, and may be as low as 3% to 1%.

The resistance of the conductive layer can be measured in accordance with methods known to those of skill in the art, such as four point probes. According to one or more embodiments, the resistance of the conductive layer is no more than $10^4$ Ω/sq, preferably no more than $10^3$ Ω/sq and more preferably no more than 100 Ω/sq.

According to one or more embodiments, one or more additives may be added to the conductive layer. Such additives can be selected from conductive polymers, colorants, stabilizers, plasticizers, antioxidants, surfactants, accelerants, binders, polymerization inhibitors, and solvents.

Preparation

In one or more embodiments, a dispersion of metal nanowires purchased from a commercial supplier is mixed with a dispersion of metal nanoparticles purchased from a commercial supplier to form a dispersion mixture. The dispersion mixture is then coated on a substrate. The coated substrate is measured for sheet resistance ($R_{sh}$), transparency, and haze. Each dispersion is used as received or after dilution with the solvent in which the dispersion is originally supplied. There is no further treatment to the dispersion mixture. All the blending and coating process are done at ambient temperature in the absence of radiation.

To form the transparent conductor according to one or more embodiments, any processing means known to those skilled in the art can be used. For example, liquid-phase film-forming methods can be used. Other methods include, but are not limited to, bar coating, dip-coating, spin coating, casting, die coating, blade coating, curtain coating, spray coating, etc. In one or more embodiments, a spin-coating method is used to dispose the conductive layer on a substrate.

A third aspect of the invention is directed to a method of fabricating transparent conductors. According to one or more embodiments, the method comprises providing a metal nanostructure dispersion, mixing metal nanoparticles with the metal nanowire dispersion to form a dispersion mixture, and coating the dispersion mixture onto a substrate to form a conductive layer, wherein the nanoparticles are adhered to the nanostructures. In specific embodiments, the metal nanoparticles are in situ generated.

According to one or more embodiments, the coated conductive layer defines a conductive area including the metallic nanostructures and the metallic nanoparticles and an open area substantially free of nanoparticles.

In one or more embodiments, the metal nanostructures comprise nanowires comprising a metal selected from the group consisting of Ag, Cu, Au, Al, Rh, Ir, Co, Zn, Ni, In, Bi, Pb, Fe, Pd, Pt, Sn, Ti, combinations thereof and alloys thereof. In specific embodiments, the metal nanowires comprise Ag. In one or more embodiments, the metal nanoparticles comprise a metal selected from the group consisting of Au, Ag, Cu, Al, Rh, Ir, Co, Zn, Ni, In, Bi, Pb, Fe, Pd, Pt, Sn, Ti, combinations thereof and alloys thereof. In specific embodiments, the metal nanoparticles comprise a metal selected from the group consisting of Au, Ag, Pt, combinations thereof and alloys thereof. In a very specific embodiment, the metal nanowires comprise Ag and the metal nanoparticles comprise Au.

In one or more embodiments, the blending or mixing of the metal nanoparticles and metal nanowires is performed at ambient temperature in the absence of radiation. In one or more embodiments, the coating process is performed at ambient temperature in the absence of radiation.

The invention is now described with reference to the following examples.

EXAMPLES

There are many variations and combinations that can be made based on this disclosure to prepare transparent conducting films without departure from the spirit of this disclosure. The following examples and embodiments are given for illustration purposes only and should not be used to limit the invention.

The silver nanowire dispersion was purchased from a commercial supplier, with PVP capping agent. The silver nanowires had an average diameter of 115 nm and an average length of 42 µm, and were supplied in isopropanol (IPA). The gold nanoparticle dispersion, silver nanoparticle dispersion and platinum nanoparticle dispersion was purchased from commercial suppliers. They were all supplied in water, and with a citrate capping agent. The three gold nanoparticle dispersions had an average diameter of 5 nm, 20 nm, and 100 nm, respectively. The silver nanoparticle dispersion had an average diameter of 20 nm. The platinum nanoparticle dispersion had an average diameter of <20 nm.

Example 1

As-received silver nanowire dispersion was first diluted to concentrations of 1 to 4 mg/ml by IPA. Glass substrates were pre-cleaned by sonication in IPA. Silver nanowire dispersions were spin-coated on glass substrates without any further treatment. No metal nanoparticles were added. Optical and electrical performance was measured immediately after coating.

Example 2

As-received silver nanowire dispersion was first diluted to concentrations of 1 to 4 mg/ml by IPA. Glass substrates were pre-cleaned by sonication in IPA. To each silver nanowire dispersion was added gold nanoparticle dispersion (20 nm in diameter, $7 \times 10^{11}$ particles/ml) in a ratio of 5:1 by volume. The dispersion was blended and then spin-coated on glass substrates without any further treatment. Optical and electrical performance was measured immediately after coating.

Example 3

As-received silver nanowire dispersion was first diluted to concentrations of 1 to 4 mg/ml by IPA. Glass substrates were pre-cleaned by sonication in IPA. Silver nanowire dispersions were spin-coated on glass substrates and heated at 150° C. for 30 min. No metal nanoparticles were added. Optical and electrical performance was measured after heating.

Example 4

As-received silver nanowire dispersion was first diluted to concentrations of 3 mg/ml by IPA. To 60 µl of silver nanowire dispersion were added 20 µl of gold nanoparticle dispersion (20 nm in diameter, $7 \times 10^{11}$ particles/ml) and 40 µl of water. Plastic substrates including PE, PC and PET were pre-cleaned by sonication in IPA and then cleaned by UV/$O_3$ for 10 min. The dispersion was blended and then spin-coated on plastic substrates without any further treatment. Optical and electrical performance was measured immediately after coating.

Example 5

As-received silver nanowire dispersion was first diluted to concentrations of 3 mg/ml by IPA. To 60 µl of silver nanowire dispersion were added 60 µl of water. Plastic substrates including PE, PC and PET were pre-cleaned by sonication in IPA and then treated by UV/$O_3$ for 10 min. The dispersion was blended and then spin-coated on plastic substrates without any further treatment. No metal nanoparticles were added. Optical and electrical performance was measured immediately after coating.

Example 6

As-received silver nanowire dispersion was first diluted to concentrations of 3 mg/ml by IPA. To 60 µl of silver nanowire dispersion were added 60 µl of water. Glass substrates were pre-cleaned by sonication in IPA and then treated by UV/$O_3$ for 10 min. The dispersion was spin-coated on glass substrates without any further treatment. Optical and electrical performance was measured immediately after coating.

Example 7

As-received silver nanowire dispersion was first diluted to concentrations of 3 mg/ml by IPA. To 60 µl of silver nanowire dispersion were added 60 µl of gold nanoparticle dispersion (5 nm in diameter). The concentration of the gold nanoparticle dispersion was carefully chosen so that the obtained transparent conductor has a sheet resistance of ~80 Ω/sq at 89% transmittance. Glass substrates were pre-cleaned by sonication in IPA and then cleaned by UV/$O_3$ for 10 min. The dispersion was blended and then spin-coated on glass substrates without any further treatment. Optical and electrical performance was measured immediately after coating.

Example 8

As-received silver nanowire dispersion was first diluted to concentrations of 3 mg/ml by IPA. To 60 µl of silver nanowire dispersion were added 60 µl of gold nanoparticle dispersion (20 nm in diameter). The concentration of the gold nanoparticle dispersion was carefully chosen so that the obtained transparent conductor has a sheet resistance of ~80 Ω/sq at 89% transmittance. Glass substrates were pre-cleaned by sonication in IPA and then cleaned by UV/$O_3$ for 10 min. The dispersion was blended and then spin-coated on glass substrates without any further treatment. Optical and electrical performance was measured immediately after coating.

Example 9

As-received silver nanowire dispersion was first diluted to concentrations of 3 mg/ml by IPA. To 60 µl of silver nanowire dispersion were added 60 µl of gold nanoparticle dispersion (100 nm in diameter). The concentration of the gold nanoparticle dispersion was carefully chosen so that the obtained transparent conductor has a sheet resistance of ~80 Ω/sq at 89% transmittance. Glass substrates were pre-cleaned by sonication in IPA and then cleaned by UV/O$_3$ for 10 min. The dispersion was blended and then spin-coated on glass substrates without any further treatment. Optical and electrical performance was measured immediately after coating.

Example 10

As-received silver nanowire dispersion was first diluted to concentrations of 3 mg/ml by IPA. To 60 µl of silver nanowire dispersion were added 60 µl of silver nanoparticle dispersion (20 nm in diameter). The concentration of the silver nanoparticle dispersion was carefully chosen so that the obtained transparent conductor has a sheet resistance of ~80 Ω/sq at 89% transmittance. Glass substrates were pre-cleaned by sonication in IPA and then cleaned by UV/O$_3$ for 10 min. The dispersion was blended and then spin-coated on glass substrates without any further treatment. Optical and electrical performance was measured immediately after coating.

Example 11

As-received silver nanowire dispersion was first diluted to concentrations of 3 mg/ml by IPA. To 60 µl of silver nanowire dispersion were added 60 µl of platinum nanoparticle dispersion (<20 nm in diameter). The concentration of the platinum nanoparticle dispersion was carefully chosen so that the obtained transparent conductor has a sheet resistance of ~80 Ω/sq at 89% transmittance. Glass substrates were pre-cleaned by sonication in IPA and then cleaned by UV/O$_3$ for 10 min. The dispersion was blended and then spin-coated on glass substrates without any further treatment. Optical and electrical performance was measured immediately after coating.

Example 12

As-received silver nanowire dispersion was first diluted to concentrations of 4 mg/ml by IPA. To 60 µl of silver nanowire dispersion were added 60 µl of water. PE substrates were pre-cleaned by sonication in IPA and then cleaned by UV/O$_3$ for 10 min. The dispersion was spin-coated on PE substrates. Sheet resistance was measured immediately after coating, after heating at 60° C. for 20 min, 100° C. for 20 min, 130° C. for 20 min and 150° C. for 20 min.

Example 13

As-received silver nanowire dispersion was first diluted to concentrations of 4 mg/ml by IPA. To 60 µl of silver nanowire dispersion were added 20 µl of gold nanoparticle dispersion (20 nm in diameter, 7×10$^{11}$ particles/ml) and 40 µl of water. PE substrates were pre-cleaned by sonication in IPA and then cleaned by UV/O$_3$ for 10 min. The dispersion was blended and then spin-coated on PE substrates. Sheet resistance was measured immediately after coating, after heating at 60° C. for 20 min, 100° C. for 20 min, 130° C. for 20 min and 150° C. for 20 min.

Results

The coated transparent conductors were measured for sheet resistance ($R_{sh}$), transmittance, and haze.

Figure 3:
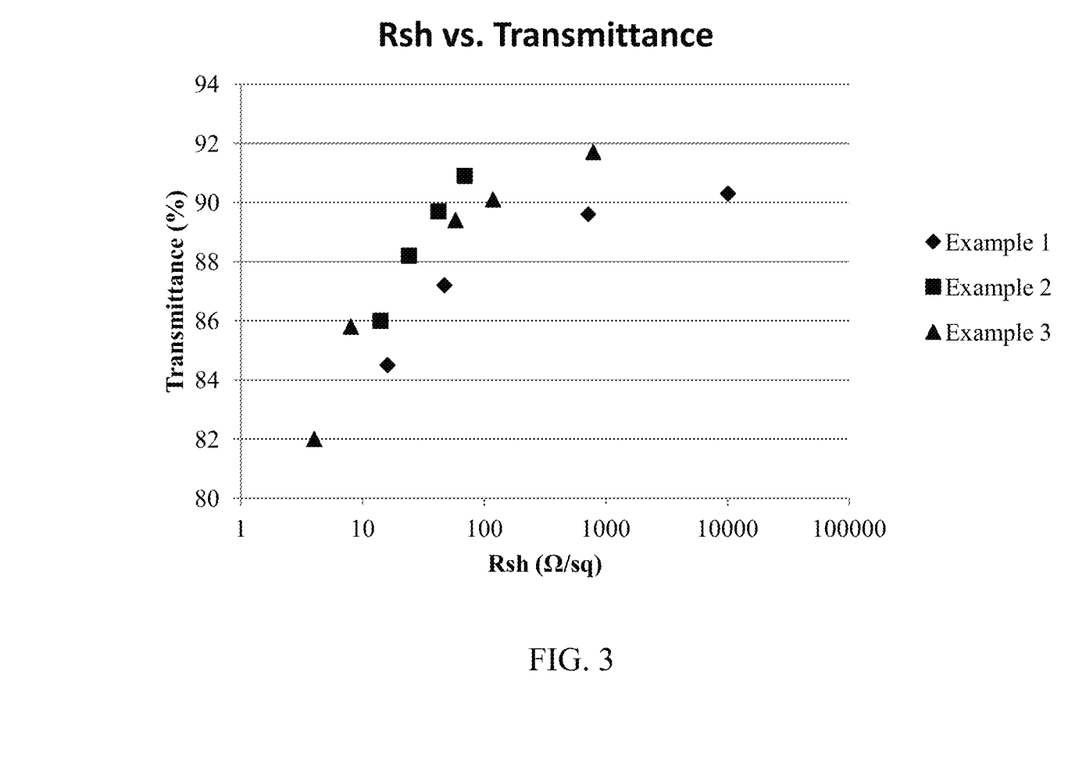
FIG. 3 is a graph of sheet resistance ($R_{sh}$) versus transmittance for Examples prepared according to embodiments of the invention.
Figure 4:
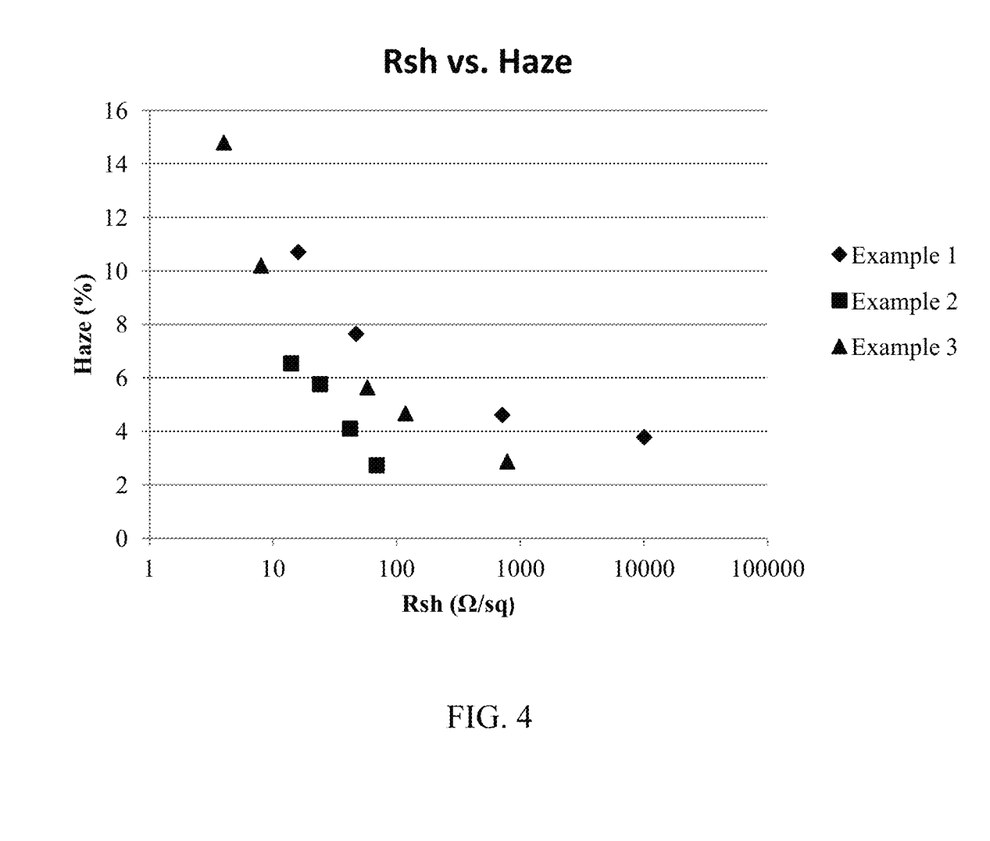
FIG. 4 is a graph of sheet resistance ($R_{sh}$) versus haze for Examples prepared according to embodiments of the invention.

As illustrated in FIGS. 3 and 4, introduction of gold nanoparticles (20 nm in diameter, Example 2) reduces the sheet resistance by up to 1-2 orders of magnitude without heat treatment, while keeping the transmittance or haze the same. At high transmittance region (transmittance >90%), the sheet resistance of Example 2 is even better than Example 3, which represents silver nanowire-based transparent conductors heated at 150° C.

As shown in Tables 1, 2 and 3, introduction of gold nanoparticles (20 nm in diameter, Example 4) reduces the sheet resistance by more than 2 orders of magnitude without heat treatment or optical irradiation while maintaining the same transmittance or haze.

TABLE 1

| PE substrate | $R_{sh}$ (Ω/sq) | Transmittance (%) | Haze (%) |
| --- | --- | --- | --- |
| Example 4 | 280 | 89 | 3 |
| Example 5 | 50000 | 89 | 3 |

TABLE 2

| PC substrate | $R_{sh}$ (Ω/sq) | Transmittance (%) | Haze (%) |
| --- | --- | --- | --- |
| Example 4 | 250 | 90 | 3 |
| Example 5 | 50000 | 90 | 3 |

TABLE 3

| PET substrate | $R_{sh}$ (Ω/sq) | Transmittance (%) | Haze (%) |
| --- | --- | --- | --- |
| Example 4 | 265 | 89 | 4 |
| Example 5 | 50000 | 90 | 3 |

Figure 5:
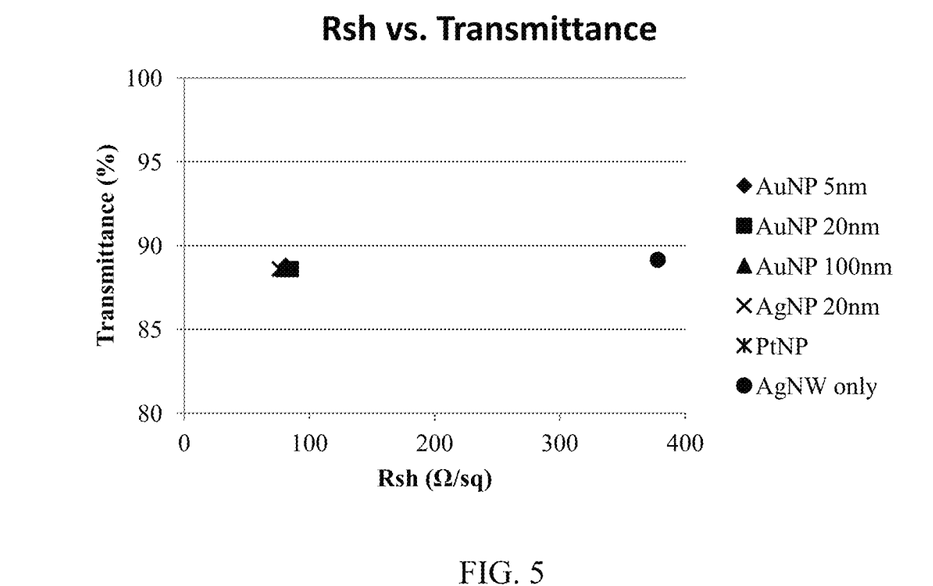
FIG. 5 is a graph of sheet resistance ($R_{sh}$) versus transmittance for Examples prepared according to embodiments of the invention.

Gold nanoparticles of different sizes, silver nanoparticles, and platinum nanoparticles were introduced to the silver nanowire dispersion and compared. As shown in FIG. 5, reduction in sheet resistance was observed for all metal nanoparticles. The concentration of each metal nanoparticle dispersion is provided in Table 4.

TABLE 4

| Metal Nanoparticle | Nanoparticle Size (nm) | Concentration (µg/mL) | (#/mL) |
| --- | --- | --- | --- |
| AuNP | 5 | 0.45 | 3.5 E11 |
| AuNP | 20 | 4.9 | 5.8 E10 |
| AuNP | 100 | 28 | 2.8 E9 |
| AgNP | 20 | 1.6 | 3.5 E10 |
| PtNP | <20 | <14 | 1.5 E11 |

In order to improve wire-to-wire contact for better electrical conductivity, heat treatment is usually required. The heat treatment typically occurs at 100° C. to 200° C. for 10 to 30 minutes. Without this heat treatment step, the resistance of the metal nanowire films is too high for electronic devices. While producing metal nanowire films with suitable resistance, such heat treatment, however, inhibits the use of metal nanowires on heat-sensitive substrates and adds an additional step to the fabrication process. As illustrated in Table 5, when silver nanowires are spin-coated on PE substrates, heating at above 100° C. for films containing only silver nanowires (Example 12) causes a significant increase in sheet resistance, and the film shows poorer uniformity. However, when a silver nanowire dispersion is mixed with a gold nanoparticle dispersion (Example 13), the resulting film shows improved stability upon heat treatment. Thus, there is potential for transparent conductors comprising a mixture of a dispersion of metallic nanowires and a dispersion of metallic nanoparticles to be use on heat-sensitive substrates without adversely affecting sheet resistance.

TABLE 5

| Temperature (° C.) | Example 12 $R_{sh}$ (Ω/sq) | Example 13 $R_{sh}$ (Ω/sq) |
|---|---|---|
| No heat | 280 | 56 |
| 60 | 250 | 64 |
| 100 | 370 | 53 |
| 130 | 700~6000 | 78 |
| 150 | 2000~10000 | 86 |

All references, including publications, patent applications, and patents, cited herein are hereby incorporated by reference for all purposes to the same extent as if each reference were individually and specifically indicated to be incorporated by reference and were set forth in its entirety herein.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A nanostructure dispersion comprising:
a mixture of a dispersion of host metallic nanostructures having a first organic coating on an exterior surface of the host metallic nanostructures and metallic nanoparticles having a second organic surface coating on an exterior surface of the metallic nanoparticles, the host metallic nanostructures forming a network that supports the metallic nanoparticles, the second organic coating being different than the first organic coating such that the metallic nanostructures and metallic nanoparticles are attracted to each other upon admixture of the host metallic nanostructures and metallic nanoparticles and remain attracted upon deposition of the mixture onto a substrate.

2. The nanostructure dispersion of claim 1, wherein the metallic nanoparticles are preformed and provided in a dispersion or in situ generated upon formation of the mixture.

3. The nanostructure dispersion of claim 1, wherein upon application of the dispersion to a substrate, the mixture forms a conductive layer including a first region defined by the metallic nanostructures and metallic nanoparticles attracted to the nanostructures and a second region including an open area, wherein there are substantially no free nanoparticles in the open area.

4. The nanostructure dispersion of claim 1, wherein the nanostructures and nanoparticles are attracted to each other upon admixture without radiation or heating.

5. The nanostructure dispersion of claim 1, wherein the first organic coating comprises a layer that is less than 10 nm in thickness.

6. The nanostructure dispersion of claim 5, wherein the first organic coating comprises a polymer.

7. The nanostructure dispersion of claim 6, wherein the polymer comprises polyvinylpyrrolidone.

8. The nanostructure dispersion of claim 7, wherein the second organic coating is selected from citrate, polyvinyl pyrollidone (PVP), tannic acid, lipoic acid, polyethylene glycol (PEG), and polyethyleneimine.

9. The nanostructure dispersion of claim 8, wherein the second organic coating comprises citrate.

10. The nanostructure dispersion of claim 8, wherein the nanostructures and nanoparticles are adhered to each other and remain adhered upon deposition of the mixture onto a substrate.

11. The nanostructure dispersion of claim 10, wherein the metallic nanostructures comprise metallic nanowires.

12. The nanostructure dispersion of claim 11, wherein the metallic nanowires comprise a metal selected from the group consisting of Ag, Cu, Au, Al, Rh, Ir, Co, Zn, Ni, In, Bi, Pb, Fe, Pd, Pt, Sn, Ti, combinations thereof and alloys thereof.

13. The nanostructure dispersion of claim 12, wherein the metallic nanowires comprise Ag.

14. The nanostructure dispersion of claim 12, wherein the metallic nanoparticles comprise a metal selected from the group consisting of Au, Ag, Cu, Al, Rh, Ir, Co, Zn, Ni, In, Bi, Pb, Fe, Pd, Pt, Sn, Ti, combinations thereof and alloys thereof.

15. The nanostructure dispersion of claim 14, wherein the metallic nanoparticles comprise a metal selected from the group consisting of Au, Pt, Ag, combinations thereof, or alloys thereof.

* * * * *